(12) United States Patent
Uskela

(10) Patent No.: US 6,983,145 B1
(45) Date of Patent: Jan. 3, 2006

(54) METHOD FOR HANDLING A CALL WHEN DESTINED SUBSCRIBER IS UNABLE TO ANSWER

(75) Inventor: Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 462 days.

(21) Appl. No.: 10/049,437

(22) PCT Filed: Aug. 11, 2000

(86) PCT No.: PCT/FI00/00687

§ 371 (c)(1),
(2), (4) Date: Feb. 12, 2002

(87) PCT Pub. No.: WO01/13665

PCT Pub. Date: Feb. 22, 2001

(30) Foreign Application Priority Data

Aug. 12, 1999 (FI) .................................. 19991715

(51) Int. Cl.
*H04Q 7/20* (2006.01)
*H04M 5/00* (2006.01)
*H04M 3/00* (2006.01)

(52) U.S. Cl. .............................. 455/426.2; 455/426.1; 455/428; 455/432.3; 455/550.1; 379/265.02; 379/101.01; 379/266.01

(58) Field of Classification Search .............. 455/445, 455/458, 567, 554.1, 555, 426.1, 426.2, 428, 455/432.3, 433, 435.1; 379/265.01, 265.02, 379/265.05, 265.06, 265.07, 265.09, 265.1
See application file for complete search history.

(56) References Cited

U.S. PATENT DOCUMENTS

| | | | |
|---|---|---|---|
| 4,577,067 A | | 3/1986 | Levy et al. |
| 5,117,451 A | * | 5/1992 | Ladd et al. ............... 379/88.26 |
| 5,309,512 A | | 5/1994 | Blackmon et al. |
| 5,319,701 A | * | 6/1994 | Hird et al. ................... 379/132 |
| 5,444,774 A | * | 8/1995 | Friedes ................... 379/266.01 |
| 5,535,270 A | * | 7/1996 | Doremus et al. ....... 379/266.01 |
| 5,579,372 A | * | 11/1996 | Åström ................... 455/412.1 |
| 5,841,854 A | * | 11/1998 | Schumacher et al. .. 379/265.11 |
| 6,064,730 A | * | 5/2000 | Ginsberg ................ 379/265.09 |
| 6,088,597 A | * | 7/2000 | Sato et al. .................. 455/560 |
| 6,118,861 A | * | 9/2000 | Gutzmann et al. ..... 379/201.01 |

(Continued)

FOREIGN PATENT DOCUMENTS

EP 424 015 4/1991

(Continued)

Primary Examiner—Lester G. Kincaid
Assistant Examiner—Huy Phan
(74) Attorney, Agent, or Firm—Pillsbury Winthrop Shaw Pittman LLP

(57) ABSTRACT

The present invention relates to a telephone system including at least a terminal used by subscriber A, a terminal used by subscriber B, a switching center for setting up a call between subscribers A and B, and a connection for connecting subscriber A's terminal to an audiovisual source when subscriber B is unable to answer. To offer a waiting subscriber a more user-friendly service than before, the system includes a plural number of alternative AV sources, the connection being arranged to connect subscriber A's terminal to the AV source chosen by subscriber A when subscriber B is unable to answer.

12 Claims, 3 Drawing Sheets

U.S. PATENT DOCUMENTS

| | | | |
|---|---|---|---|
| 6,301,354 B1 * | 10/2001 | Walker et al. | 379/266.01 |
| 6,307,845 B1 * | 10/2001 | Hummelgren et al. | 370/328 |
| 6,320,588 B1 * | 11/2001 | Palmer et al. | 345/473 |
| 6,333,979 B1 * | 12/2001 | Bondi et al. | 379/219 |
| 6,434,126 B1 * | 8/2002 | Park | 370/328 |
| 6,456,601 B1 * | 9/2002 | Kozdon et al. | 370/259 |
| 6,545,589 B1 * | 4/2003 | Fuller et al. | 340/7.22 |
| 2004/0005046 A1 * | 1/2004 | Deoe t al. | 379/220.01 |
| 2005/0078810 A1 * | 4/2005 | Cromwell et al. | 379/188 |

FOREIGN PATENT DOCUMENTS

| | | |
|---|---|---|
| EP | 736 994 | 10/1996 |
| WO | WO 97/26749 | 7/1997 |
| WO | WO 00/24183 | 4/2000 |

* cited by examiner

METHOD FOR HANDLING A CALL WHEN DESTINED SUBSCRIBER IS UNABLE TO ANSWER This is a National Stage application of International Application No. PCT/FI00/00687, which was filed on Aug. 11, 2000, which designated the U.S. and was filed in the English language.

BACKGROUND OF THE INVENTION

The invention relates to a method for handling a call made by subscriber A using a subscriber terminal, which comprises a telecommunications part and an AV part for displaying audio and/or visual information, to a subscriber terminal of subscriber B when subscriber B is unable to answer. In the method, the terminal of subscriber A, or at least its AV part, is operationally connected to an audiovisual source for the time subscriber A waits for subscriber B to answer or to become available. When B answers or becomes available, the call is connected between subscribers A and B. The invention also relates to a telephone system comprising at least a terminal used by subscriber A, a terminal used by subscriber B, a switching centre for setting up a call between subscribers A and B, and connecting means for connecting subscriber A's terminal of to an audiovisual source when subscriber B is unable to answer. The invention further relates to a telephone apparatus comprising a telecommunications part, an AV part and a user interface.

The method and the telephone system associated with it relate to offering call waiting services when subscriber A wishes to wait for subscriber B to answer or to become available, when B is busy or unable to answer. In practice, when subscriber B is unable to answer, the call made by subscriber A may be connected to an exchange where an operator asks whether subscriber A wishes to wait, or subscriber B may have a call waiting supplementary service, in which case, if A wishes to be put on hold, B will receive a call waiting tone indicating that a call is waiting.

Prior art mobile communications systems, such as the GSM system (Global System for Mobile Communications), comprise a Call Waiting Supplementary Service which indicates to subscriber B that a call is waiting, thereby allowing subscriber B to decide whether to accept, reject or ignore the waiting call. In addition, numerous private branch exchanges comprise a waiting functionality, which means that while waiting for the other party to answer, subscriber A may listen to music recorded on tape. Current solutions therefore only have two options to offer to subscriber A: either to drop the call or to hold and listen to a pre-selected audio source. In the latter case, subscriber A has to listen to music selected by subscriber B or the operator, for example. From subscriber A's point of view, the prior art solution is not particularly user-friendly.

BRIEF DESCRIPTION OF THE INVENTION

An object of the present invention is to solve the above described problem and to provide a solution offering increased user-friendliness and a wider range of options to subscriber A holding the line. This is achieved with a method of the invention characterized by offering a plural number of alternative AV sources to subscriber A, receiving information about the AV source selected by subscriber A, and connecting the terminal used by subscriber A, or at least its AV part, to the audiovisual source chosen by subscriber A. AV in this context refers to audio or visual information or a combination thereof.

The invention also relates to a telephone system where the method of the invention can be applied. The telephone system of the invention is characterized in that the system comprises a plural number of alternative AV sources, and that connecting means are arranged to connect the terminal of subscriber A to an audiovisual source chosen by subscriber A when subscriber B is unable to answer.

The invention further relates to a telephone apparatus with which the method of the invention can be utilized and which is suited to be used in the telephone system of the invention. The telephone apparatus comprises a telecommunications part, which the telephone apparatus uses for communicating with the network, and an audiovisual part which is used for relaying audio and/or visual information to the subscriber. The telephone apparatus of the invention is characterized in that the telephone apparatus also comprises an audiovisual source and connecting means for connecting the AV part to the AV source in response to control signals relayed from other parts of the telephone system to indicate that subscriber B is unable to answer.

The basic idea of the invention is that it allows subscriber-specific wishes to be taken into account by giving the subscriber the possibility to choose the AV source he/she wishes to listen to and/or watch while waiting for the other party to answer or to become available. Hence the most significant advantage of the invention is that while waiting, the subscriber listens to and/or watches an audiovisual source that he/she finds pleasing and/or useful, instead of being dependent on call waiting tone services selected in advance by someone else.

In a preferred embodiment of the method of the invention, subscriber-specific information about the AV sources selected by each subscriber is stored in advance into a memory means. When the called party is unable to answer, the connecting means connect the subscriber to an AV source corresponding to the subscriber information stored. The advantage of this is that the subscriber does not need to re-select the desired AV source every time.

In another embodiment of the method of the invention, when the called party is unable to answer, the subscriber receives information about the AV sources that are available. The subscriber then selects an AV source, the choice is received, and the subscriber is connected to an AV source corresponding to his/her choice. This allows the subscriber to always choose the AV source that suits or pleases him/her best. The available AV sources may have been determined by subscriber A, the operator or another service supplier, or by subscriber B. The choice can be made using for example WAP technology (Wireless Application Protocol), in which case the subscriber selects the AV source from a menu sent to him/her, or IVR technology (Interactive Voice Response), in which case the subscriber enters his/her choice using the keys of the terminal according to the instructions and alternatives given as audio messages.

The telephone system of the invention can be implemented either in a mobile communications system or in a public telephone network. In a mobile communications system, the data about the AV sources selected by the subscribers may be stored into a home register. The data is then transferred together with other subscriber data as the subscriber moves in the system. In this case the connecting means that connect the subscriber to the selected AV source may be parts of an intelligent network, such as a Specialised Resource Function SRF or a Service Control Function SCF which read the data from the subscriber register and perform the connection in accordance with the data read.

A plural number of alternative AV sources may also be arranged at a private branch exchange, the connection to the selected AV source then taking place at the exchange when the party connected to the exchange is unable to answer. This solution is easy to implement, because the changes to be made to the system only affect the exchange.

A telephone apparatus of a preferred embodiment of the invention is provided with an AV source that may include music stored into a memory, other stored audio and/or video material, or a radio. With this type of telephone apparatus, the information from the AV source is not transmitted to the subscriber over telephone connections, whereby the use of telephone links, and radio resources in particular, is reduced. The connection of the AV source to the AV part of the telephone apparatus is controlled by signals arriving from other parts of the system, such as from the switching centre serving subscriber B, from an exchange or from subscriber B's terminal, which first indicate that subscriber B is unable to answer and later inform when subscriber B becomes available.

The preferred embodiments of the method, telephone system and telephone apparatus of the invention are disclosed in the accompanying dependent claims.

BRIEF DESCRIPTION OF THE DRAWINGS

In the following the invention will be described in greater detail in with reference to the accompanying drawings, in which.

DETAILED DESCRIPTION OF THE INVENTION

Figure 1:
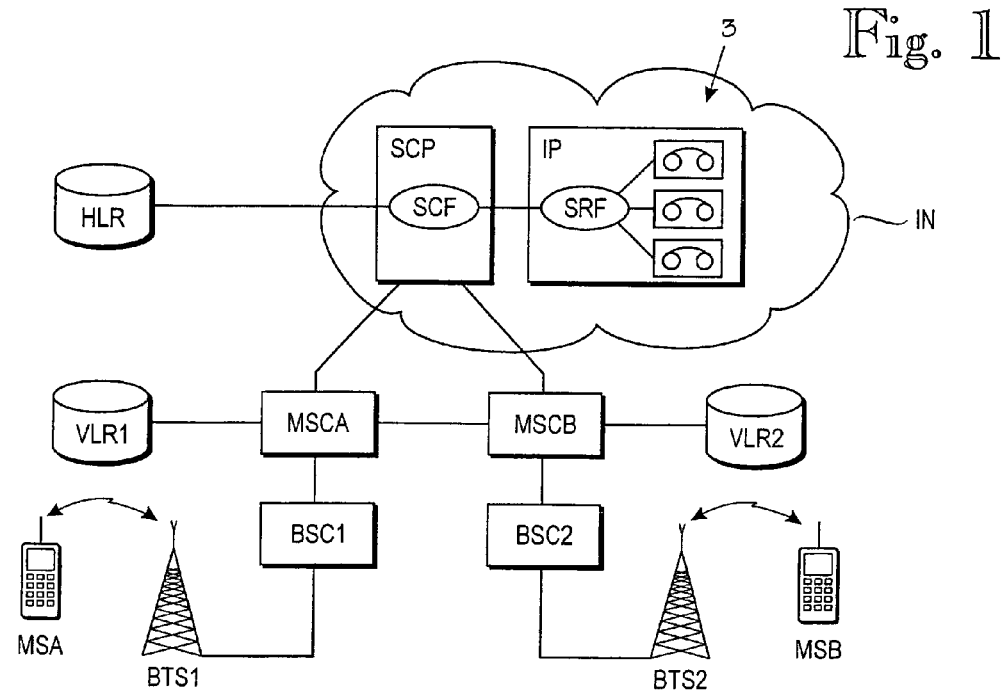
FIG. 1 is a block diagram illustrating a mobile communications system of the invention implemented as a GSM mobile communications system.

FIG. 1 is a block diagram illustrating a mobile communications system of the invention, which in this example is a cellular GSM system.

The mobile communications system shown in FIG. 1 comprises two Mobile Switching Centres MSCA and MSCB which both switch calls between Mobile Stations MSA and MSB located within their coverage area through Base Station Controllers BSC1 and BSC 2 and Base Transceiver Stations BTS1 and BTS2. In this example, MSA is the subscriber A's terminal, i.e. the calling party, and MSB is subscriber B's terminal, i.e. the called party. The mobile switching centres MSCA and MSCB both comprise a Visitor Location Register, VLR1 and VLR2, respectively, where information about subscribers presently located in the areas of the switching centres is maintained. The mobile communications system further comprises a Home Location Register HLR where information about the mobile subscribers registered into the network is maintained. The described mobile communications system comprises a plural number of audiovisual sources 3 which in this example only include audio sources. According to the idea of the invention, the information about the AV sources 3 selected by subscriber A may be stored in the home location register HLR from where they are copied, together with other subscriber information, into the visitor location registers VLR when the subscriber moves in the network. The described mobile communications system further includes an Intelligent Network part IN which comprises a Specialised Resource Function SRF and a Service Control Function SCF. The network element implementing the latter function is called a Service Control Point SCP. The service can be supplied for example in CAMEL service environment (Common Applications for Mobile Enhanced Logic). The specialised resource function SRF can be implemented using an element known as an Intelligent Peripheral IP. The above-mentioned intelligent network parts read the information indicating subscriber A's choice of AV source from the subscriber register HLR or VLR1, for example, and connect subscriber A's terminal MSA to the desired audio source 3. The audio source alternatives may include recorded music or announcements, such as news reports and weather forecasts, commercials, or the radio. Network operators may also use a particular type of music or other audio material to build complete packages around a theme. Other audio source types are also possible. The audio sources may be placed for example in an IP element.

Figure 2:
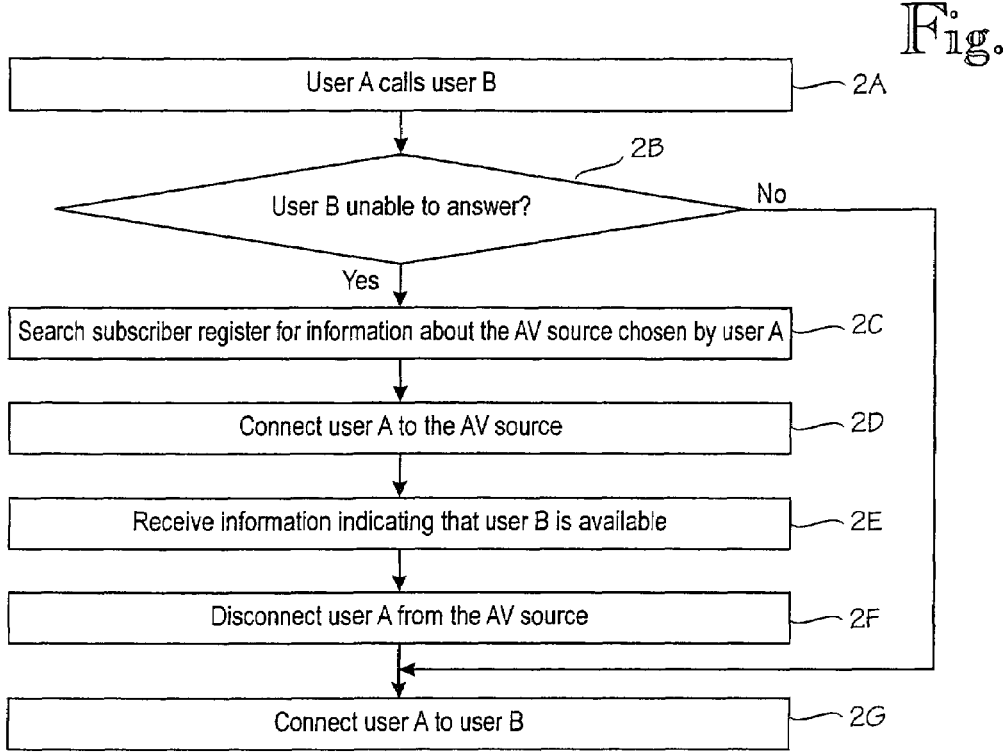
FIG. 2 is a flow diagram illustrating a method of the invention in which subscriber A has selected an audiovisual source prior to making a call.

FIG. 2 is a flow diagram illustrating the method of the invention in which subscriber A has selected the AV source in advance, prior to making the call. In step 2A subscriber A calls subscriber B's telephone number. In step 2B is checked whether subscriber B is unable to answer and, if so, the routine proceeds to step 2C where the subscriber register is searched for information about an AV source chosen in advance by subscriber A. This information may be stored for example in the home location register, in which case it is relayed together with other subscriber information as the subscriber moves in the system. The recording may be carried out for example when the telephone connection is registered by the network operator, or later by the subscriber. In an intelligent network it may then be possible to select the AV source for example by calling a service number or by using WAP technology. In step 2D the terminal of subscriber A, or at least its AV part, is connected to an AV source corresponding to the information read from the register. Subscriber A listens to and/or watches the AV source until information arrives, in step 2E, from other parts of the system, such as the switching centre serving subscriber B, or directly from B's terminal, indicating that subscriber B has become available. In step 2F subscriber A is disconnected from the AV source and in step 2G a normal call connection is established between subscribers A and B. If in step 2B it is detected that subscriber B is not busy, then the routine proceeds from step 2B directly to step 2G.

Figure 3:
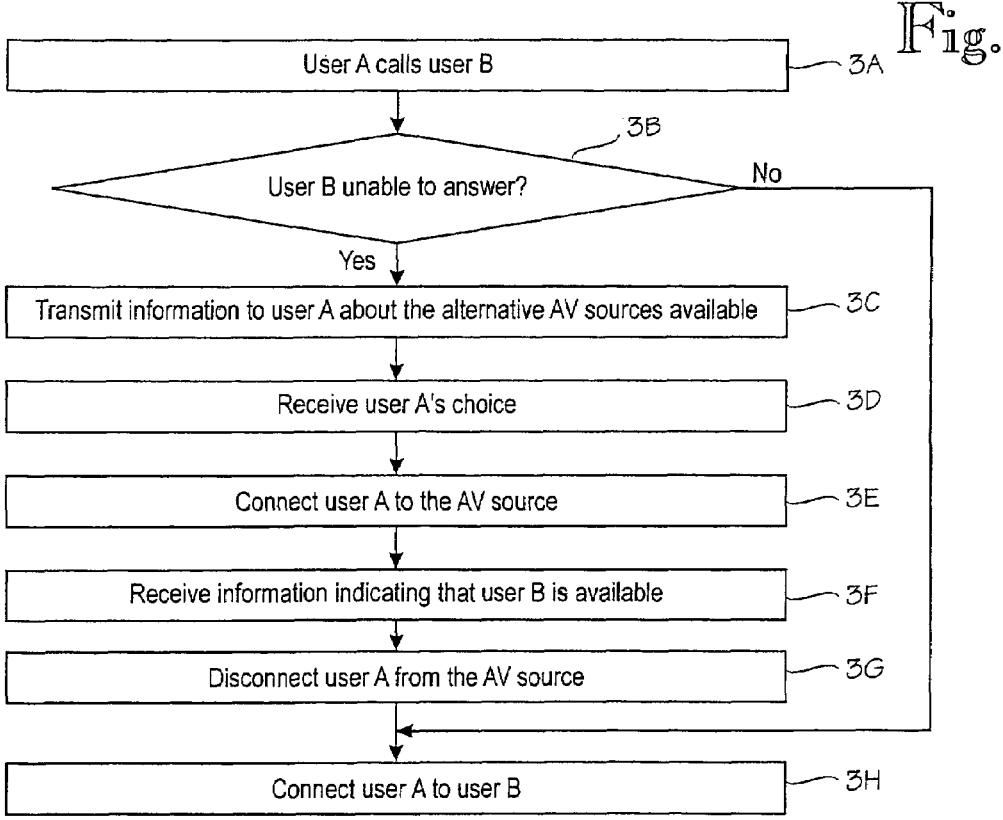
FIG. 3 is a flow diagram illustrating a method of the invention in which subscriber A selects an AV source after subscriber B is found to be unable to answer.

FIG. 3 is a flow diagram illustrating the method of the invention when subscriber A selects the AV source after he/she has found out that subscriber B is unable to answer. Steps 3A and 3B correspond to steps 2A and 2B in FIG. 2. If in step 3B it is found out that subscriber B is not busy, then the routine proceeds directly to step 3H, whereas if subscriber B is unable to answer, then the routine proceeds to step 3C where information about the available AV sources is transmitted to subscriber A. This information may be given for example as audio messages to which subscriber A responds by using the telephone keys according to the instructions he/she hears over the phone, or subscriber A may receive a menu from which he/she makes the choice. In step 3D the connecting means receive subscriber A's choice and in step 3E they connect subscriber A's terminal, or at least its AV part, to the selected AV source. Subscriber A listens to and/or watches the AV source until in step 3F information arrives from other parts of the system indicating that subscriber B has become available. In step 3G subscriber A is disconnected from the AV source and in step 3H a normal call connection is set up between subscribers A and B.

Figure 4:
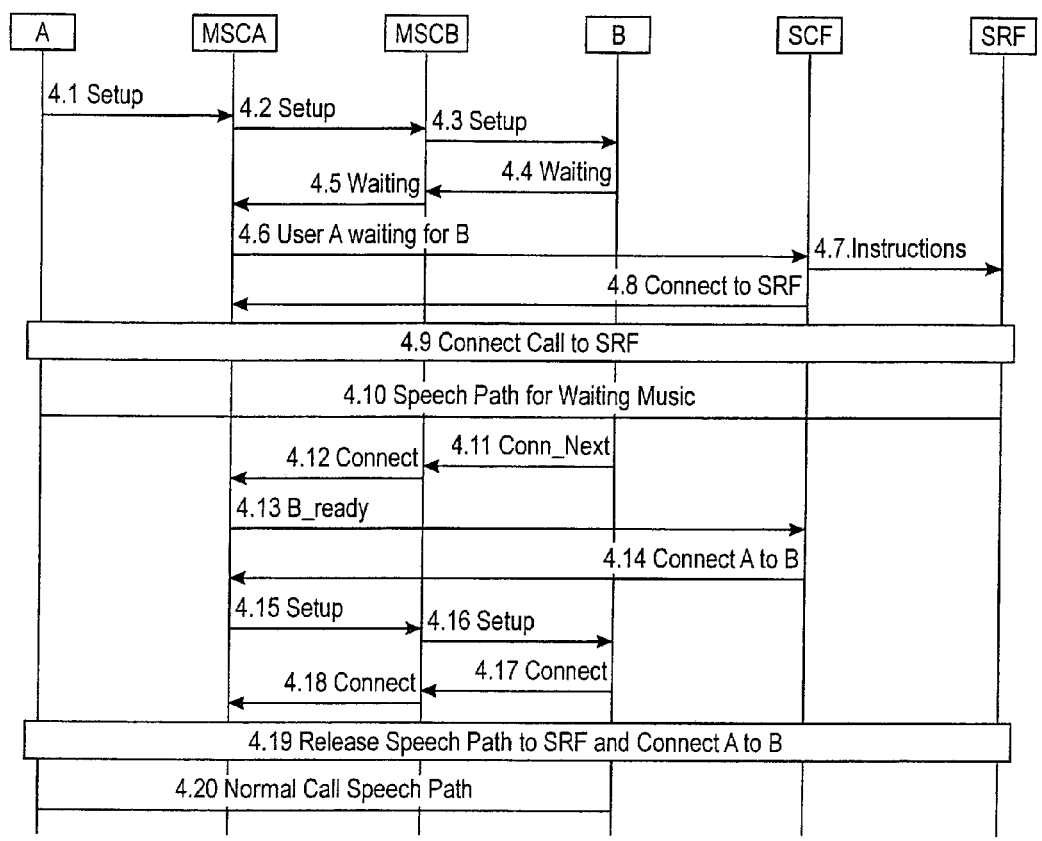
FIG. 4 is a signalling diagram illustrating the method of the invention applied to the mobile communications system of FIG. 1.

FIG. 4 is a signalling diagram illustrating the method of the invention when applied to the mobile communications system shown in FIG. 1. In steps 4-1 . . . 4-3 subscribe A uses his/her terminal in an ordinary manner to call subscriber B's terminal. In step 4—4 information is transmitted from subscriber B's terminal to the mobile switching centre MSCB serving subscriber B to indicate that B is unable to answer. Next, in step 4-5, this information is transmitted further to the mobile switching centre MSCA serving subscriber A. In step 4-6 information is transmitted from the mobile switching centre MSCA to the service control function SCF to indicate that subscriber A is waiting. At the same time the service control function SCF is asked for further instructions. In response to the inquiry, the service control function SCF instructs the specialised resource function SRF in step 4-7 to connect the AV source corresponding to the subscriber information, i.e. the audio source in this case. At the same time, a message depicted as step 4-8 is transmitted from the service control function SCF to the mobile switching centre MSCA serving subscriber A to request a connection to be set up from subscriber A's terminal to the specialised resource function SRF. In step 4-9 subscriber A's terminal is connected to the specialised resource function SRF, and in step 4-10 a connection is set up for the sound from the audio source, after which subscriber A can listen to the audio source he/she has selected. In step 4-11 subscriber B is ready to answer, and information indicating this is first transmitted to the mobile switching centre MSCB serving subscriber B and further, in step 4-12, to the mobile switching centre MSCA serving subscriber A. The mobile switching centre MSCA then sends in step 4-13 information to the service control function SCF to indicate that subscriber B is ready to answer. In step 4-14 the service control function SCF instructs the mobile switching centre MSCA to set up the call between subscribers A and B. In steps 4-15 . . . 4-18 this call connection is set up as usually. In step 4-19 the connection from subscriber A to the specialised resource function SRF is released, and in step 4-20 a normal call connection is set up between the terminals of subscriber A and subscriber B.

Figure 5:
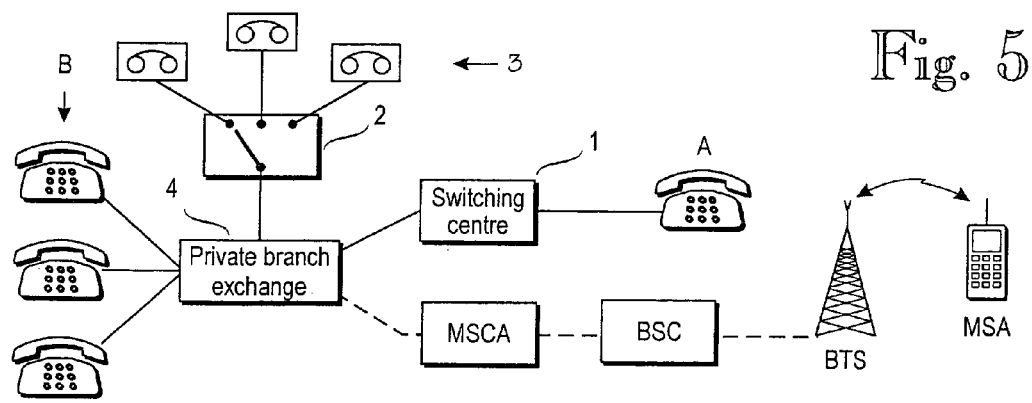
FIG. 5 is a block diagram illustrating a telephone system of the invention comprising a private branch exchange.

FIG. 5 is a block diagram illustrating the telephone system of the invention comprising a private branch exchange 4. The described telephone system includes subscriber A's terminal A, or MSA, subscriber B's terminal B, a public network switching centre 1 and a fixed private branch exchange 4 provided with connecting means 2 for connecting alternative AV sources, which in this case are audio sources 3, to subscriber A's terminal A, or MSA. The private branch exchange is for example an exchange used by a company, or another group, which serves the company's extensions and communicates with the public telecommunication network. The private branch exchange may be either an automated exchange or a manual one. In the Figure the continuous line depicting telephone connections shows a case where terminal A of subscriber A is a subscriber terminal in the public telephone network, the broken line illustrating a case where subscriber A's terminal MSA is a mobile communications system terminal, in which case the call is not switched through the public network switching centre 1 but through the mobile switching centre MSCA, the base station controller BSC and the base station BTS. In both cases the alternative audio sources are connected to subscriber A's terminal A, or MSA, according to the same principles. When subscriber B is unable to answer, subscriber A can be asked whether he/she wishes to wait. The connecting means 2 can then transmit for example audio messages about the available audio sources to subscriber A, together with instructions on how to make a choice. Following the instructions, subscriber A can then select the desired audio source among the alternatives he/she has heard by using the telephone keys. The audio sources that may be used in this case include recorded music, various announcements and the radio.

Figure 6:
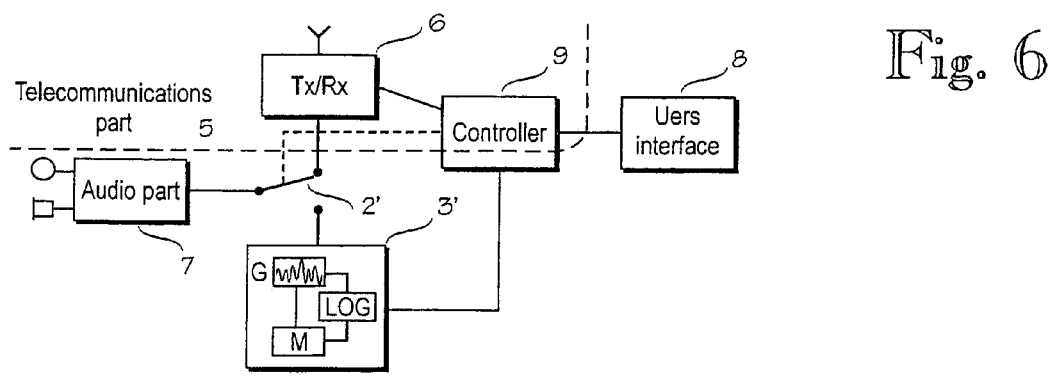
FIG. 6 is a block diagram illustrating a telephone apparatus of the invention.

FIG. 6 illustrates a telephone apparatus of the invention. The described telephone apparatus is a mobile phone, although the telephone apparatus of the invention may also be one used in the fixed telephone network. In this example, the AV source of the telephone apparatus is an audio source, i.e. it only transmits audio information. The telephone apparatus shown in the Figure comprises a telecommunications part 5 which in turn comprises a radio part 6 provided with transmit and receive functions; an audio part 7 comprising a microphone and a loudspeaker; a user interface 8 comprising a display and a keypad; a controller 9; an audio source 3' and connecting means 2' for connecting the audio source 3' to the audio part 7 under the control of the controller 9, until information is received via the radio part 6 that subscriber B is ready to answer. The audio source 3' also comprises a memory M for recording audio data, an audio generator G for generating audio signals from the audio data, and a logic circuit LOG for controlling these. The audio source is selected by applying the user interface, i.e. by using the telephone keys according to the instructions appearing on the display.

Figure 7:
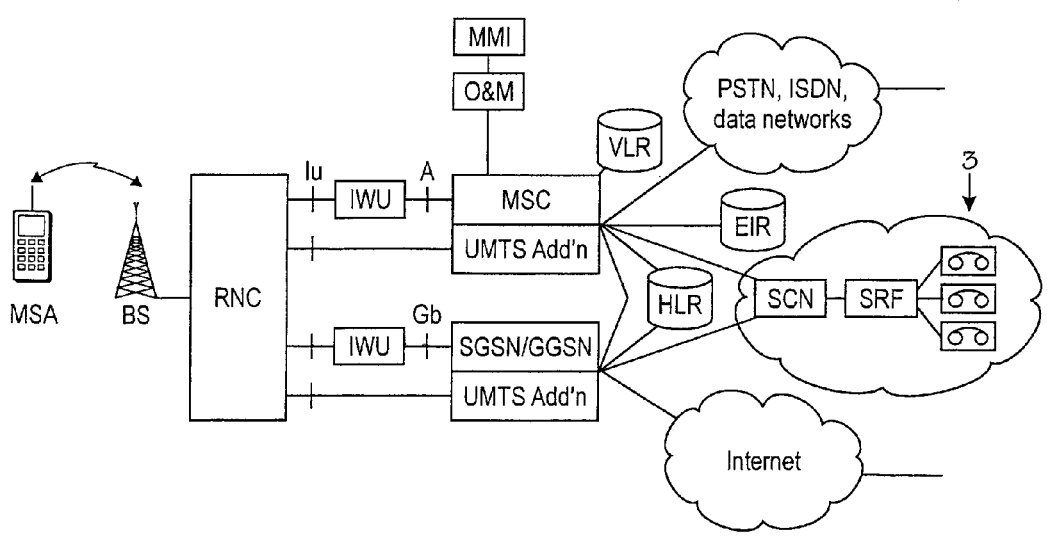
FIG. 7 is a block diagram illustrating a mobile communications system of the invention implemented as a third-generation mobile communications system.

FIG. 7 is a block diagram illustrating the telephone system of the invention implemented as a third-generation mobile communications system, which in this example is a UMTS (Universal Mobile Telecommunication System). It is to be understood that third-generation mobile communications system have not been fully standardized yet. The expressions and terms used should therefore be understood to be descriptive rather than limiting. For the sake of clarity, the Figure only shows subscriber terminal A together with the base station and the mobile switching centre serving the terminal, although the telephone system of the invention also comprises the subscriber terminal B.

The described UMTS mobile communications system comprises a mobile station MSA which functions as subscriber A's subscriber terminal and which has a radio connection to the base station BS and a data transmission connection further to a Radio Network Controller RNC. For circuit-switched connections, the radio network controller is connected to a Mobile Services Switching Centre MSC over an A interface, and for packet-switched services to a Serving GPRS Support Node SGSN, where GPRS stands for the General Packet Radio Service, over a Gb interface. The serving GPRS support node SGSN and the mobile services switching centre MSC may comprise separate UMTS elements. In the system, subscriber information is stored in the home location register HLR from where they are transferred, in connection with circuit-switched use, to the visitor location registers VLR of the mobile services switching centres MSC when the subscriber moves in the system. To interconnect the A and Gb interfaces of the GSM and GPRS systems, the Iu interface of the UMTS system may be provided with separate Interworking Units IWU. Information relating to the equipment is stored in an Equipment Identity Register EIR. To add and update subscriber-specific data, the system also comprises and Operation and Maintenance Section O&M with a Man-Machine Interface MMI. For creating additional services and for controlling them, the system is also provided with a Service Control Node SCN which is an advanced version of the service control point used in intelligent networks. From the mobile services switching centre MSC there is a connection further to circuit-switched networks and from the serving GPRS support nodes SGSN to packet-switched networks. The system includes a plural number of alternative AV sources 3 which are physically located at the specialised resource function SRF where they are controlled by the service control node SCN. The alternatives that can be used as AV sources include recorded music or announcements, such as weather forecasts and news reports, or commercials, radio, moving or still video pictures.

It is to be understood that the above specification and the related drawings are only meant to illustrate the present invention. For example, information indicating that subscriber B has become available is not necessarily issued automatically, as in the above examples, but the waiting service used by subscriber A may include a step which is repeated at regular intervals to inquire the switching centre serving subscriber B whether B is still unable to answer. In this case the AV source remains connected until a response indicating that subscriber B is available is received to the inquiry. It will be apparent to those skilled in the art that many variations and modifications can be made to the invention without departing from the scope of protection of the invention disclosed in the attached claims.

What is claimed is:

1. A method for handling a call made by subscriber A using a subscriber terminal, wherein the method comprises
   providing said subscriber terminal of the subscriber A with at least one AV source for providing audio and/or visual information to said subscriber terminal of the subscriber A;
   offering a plural number of alternative AV sources to subscriber A when subscriber B is unable to answer;
   receiving information about the AV source chosen by subscriber A; and
   connecting the terminal used by subscriber A, or an AV part of the terminal, to the AV source chosen by subscriber A for the time subscriber A waits for subscriber B to answer or to become available, after which the call is connected between subscribers A and B.

2. A method according to claim 1, wherein information about the AV source chosen by subscriber A is stored into a memory means prior to the call, and subscriber A's terminal, or at least its AV part, is connected to the AV source indicated by the subscriber-specific information stored in the memory means.

3. A method according to claim 1, wherein at least the receiving step is carried out after it has been found out that subscriber B is unable to answer.

4. A telephone system comprising at least a terminal used by subscriber A, a terminal used by subscriber B, a switching centre for setting up a call between subscribers A and B, and connecting means for connecting the subscriber A's terminal to an AV source when subscriber B is unable to answer, wherein the system comprises a plural number of alternative audiovisual sources of which at least one is arranged in said terminal used by subscriber A, and that the connecting means are arranged to connect the terminal of subscriber A to the AV source chosen by subscriber A when subscriber B is unable to answer.

5. A telephone system according to claim 4, wherein it comprises a mobile communications system.

6. A telephone system according to claim 4, wherein the telephone system comprises at least one subscriber register having a data transmission connection to a mobile services switching centre, subscriber information of subscriber terminals within the mobile communications system being maintained in the subscriber register, and connecting means comprising a specialised resource function and a service control function which read the subscriber information from the subscriber register and connect subscriber A's terminal to the AV source chosen by subscriber A on the basis of the information read.

7. A telephone system according to claim 4, wherein the connecting means, which comprise a specialised resource function and a service control function, inform subscriber A about the available AV sources, receive the choice made by subscriber A and connect subscriber A's terminal to the AV source corresponding to the choice.

8. A telephone system according to claim 4, wherein it comprises a public switched telephone network.

9. A telephone system according to claim 4, wherein it comprises a private branch exchange to which a plural number of audiovisual sources and means are connected to transmit information to subscriber A about the available AV sources, to receive the choice made by subscriber A and to connect subscriber terminal A to the AV source.

10. A subscriber terminal of a telephone system, the subscriber terminal comprising a telecommunications part, an AV part and a user interface, wherein the telephone apparatus also comprises an audiovisual source and connecting means for connecting the AV part to the AV source in response to control signals relayed from other parts of the telephone system to indicate that subscriber B is unable to answer.

11. A subscriber terminal according to claim 10, wherein the AV source also comprises a memory into which audio data has been stored, and an audio generator for generating audio signals from the audio data and for feeding the signals into the AV part.

12. A subscriber terminal according to claim 10, wherein the AV source is a radio.

* * * * *